(12) United States Patent
Segal

(10) Patent No.: US 8,508,614 B2
(45) Date of Patent: Aug. 13, 2013

(54) TELEPROMPTING SYSTEM AND METHOD

(75) Inventor: Edo Segal, New York, NY (US)

(73) Assignee: Futurity Ventures LLC, White Plains, NY (US)

( * ) Notice: Subject to any disclaimer, the term of this patent is extended or adjusted under 35 U.S.C. 154(b) by 49 days.

(21) Appl. No.: 13/152,063

(22) Filed: Jun. 2, 2011

(65) Prior Publication Data

US 2011/0298935 A1 Dec. 8, 2011

Related U.S. Application Data

(60) Provisional application No. 61/350,779, filed on Jun. 2, 2010, provisional application No. 61/370,435, filed on Aug. 3, 2010, provisional application No. 61/370,453, filed on Aug. 4, 2010.

(51) Int. Cl.
*H04N 5/228* (2006.01)

(52) U.S. Cl.
USPC ........ 348/222.1; 715/716; 715/719; 715/730; 715/753; 382/254

(58) Field of Classification Search
USPC .............. 348/222.1; 715/716, 719, 730, 753; 382/254

See application file for complete search history.

(56) References Cited

U.S. PATENT DOCUMENTS

| | | | |
|---|---|---|---|
| 2002/0186233 A1* | 12/2002 | Holtz et al. | 345/716 |
| 2008/0096175 A1* | 4/2008 | du Toit et al. | 434/308 |
| 2008/0150913 A1* | 6/2008 | Bell et al. | 345/175 |
| 2009/0153804 A1 | 6/2009 | Giraldo et al. | |
| 2009/0237565 A1* | 9/2009 | Staker et al. | 348/584 |

* cited by examiner

*Primary Examiner* — Usman Khan
(74) *Attorney, Agent, or Firm* — Leason Ellis LLP

(57) ABSTRACT

A teleprompter system and method include use of a touch-screen interface positioned intermediate to the user and a camera such that the camera captures the user's image through a transparency of the touch-screen interface. The touch screen interface is coupled to a computer and is operably connected so as to enable user control and manipulation of interactive media content generated by the computer. A video mixing component integrates images captured by the camera with interactive media content generated by the computer, as may be manipulated by the user via the touch-screen interface, to generate a coordinated presentation. The coordinated presentation can be received by one or more remote devices. The remote devices can further interact with at least the interactive media content.

20 Claims, 14 Drawing Sheets

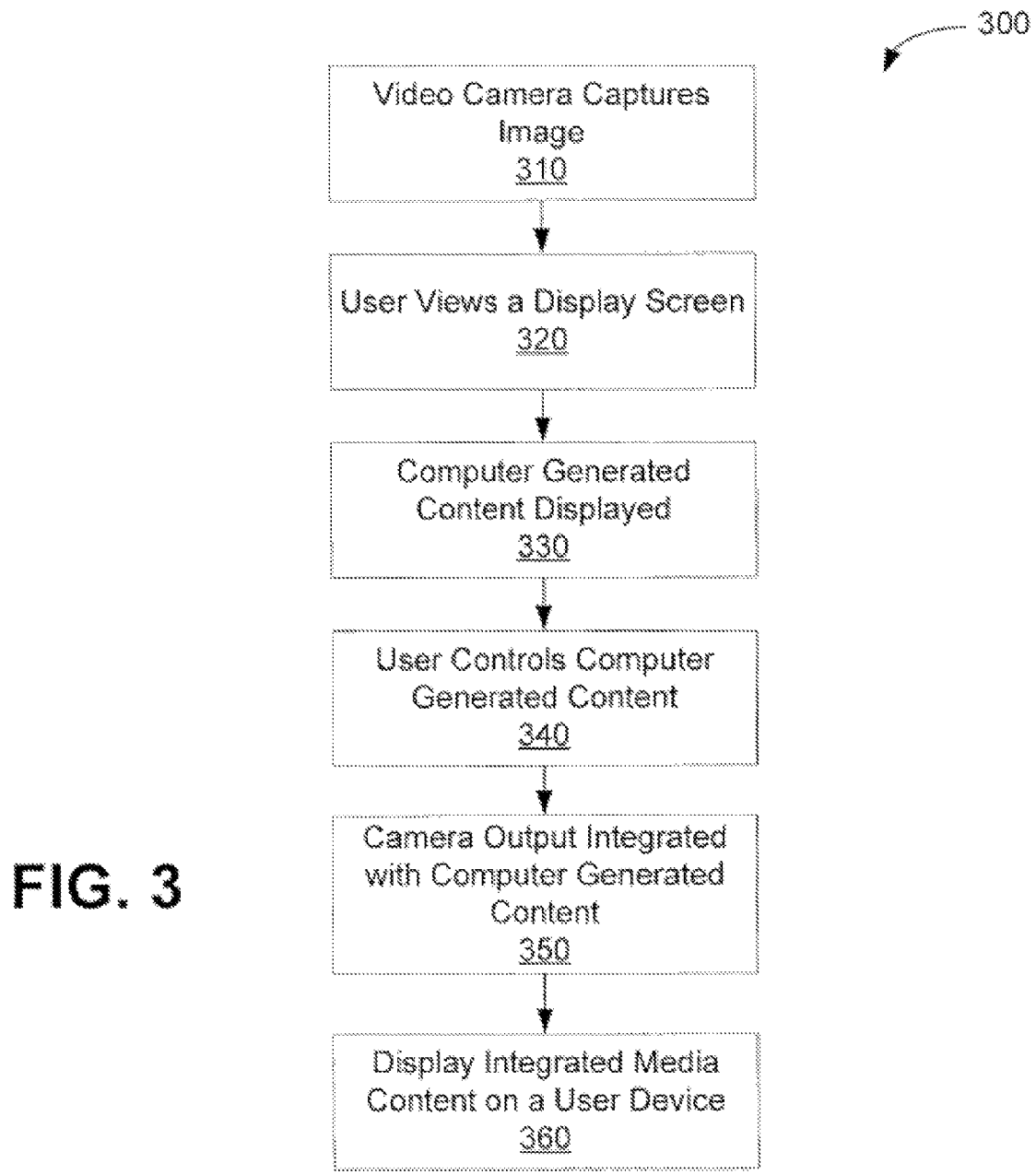

TELEPROMPTING SYSTEM AND METHOD

CROSS REFERENCE TO RELATED APPLICATIONS

This patent application claims the benefit of U.S. Provisional Application Ser. Nos. 61/350,779, filed on Jun. 2, 2010, 61/370,435, filed on Aug. 3, 2010, and 61/370,453 filed on Aug. 4, 2010, the contents of which are incorporated herein by reference in their entirety.

FIELD OF THE INVENTION

This invention relates generally to teleprompt devices, and more particularly to those which are used with cameras.

BACKGROUND OF THE INVENTION

Teleprompters, or prompting mechanisms associated with video and film cameras, are well-known accessories and commonly used by actors, news readers, news reporters and other personnel reading off prepared information and documents while being shot by the camera. These teleprompter systems typically comprise a portion which attaches to a camera lens, including a mirror with a hood, associated with a monitor located at the angle thereto, so that a person standing in front of the camera is able to view the image displayed on the monitor in the mirror. The mirror is, conventionally, a one-way mirror, thus enabling the lens behind the mirror to capture images on the other side thereof.

The monitor is typically attached to the mirror and hood. The monitor in such teleprompters is typically attached to a power source, as well as to a computer into which the text to be read by the reader in front of the camera is displayed. As the text is displayed on the monitor, it can be read through the reflected image on the mirror mounted on the lens, and at an appropriate angle to the monitor screen. The text, which should be in inverted or reverse script, is scrolled up and down along the monitor as the reader reads through the information.

In conventional teleprompters, the mirror has on one side thereof the hood or housing which defines a chamber. The housing fits onto the end of the lens of the camera. When attached to the lens, the chamber defined by the housing and mirror is essentially sealed to light, and the only light permitted to enter the chamber, and hence the lens of the camera, is that which passes through the one-way mirror. This comprises the image of the objects at which the lens is directed.

The users of such known teleprompters were generally limited to viewing the passive content displayed in conjunction with teleprompter prompts, as they had no way in which they could interact with any content so-displayed. The present invention addresses these and other needs.

Additionally, to the extent that supplemental content has been made available to such viewers, this has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

The present invention further addresses these problems in a system and method in which the broadcaster—who can even be an individual using a portable computer device—provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

SUMMARY OF THE INVENTION

According to one aspect of the present invention, a teleprompter system for generating a coordinated presentation to be viewed by one or more remote devices is provided. The system includes a computer configured by code and operable to generate interactive media content to be displayed on a display, a camera for capturing images of a user, and a display coupled to the computer that displays the media content generated from the computer. A touch-screen interface having a transparency is positioned intermediate to the user and the camera and is positioned such that the camera captures the user's image through the transparency of the touch-screen interface, the touch screen interface being coupled to the computer and operable to enable user control and manipulation of the media content generated by the computer and displayed on the display. A video mixer is coupled to the camera and is operative to integrate the user's image captured by the camera together with the interactive media content generated by the computer as manipulated by the user via the touch-screen interface, thereby generating the coordinated presentation. The one or more remote devices can receive the coordinated presentation and interact with at least the media content.

In accordance with a further aspect of the present invention, a presentation system for generating a coordinated presentation to be viewed by one or more remote devices is provided. The system includes a computer having a processor and a memory, the computer being configured by code stored in the memory and executed by the processor to generate interactive media content to be displayed on a display, a camera for capturing one or more images; and a display coupled to the computer that displays the media content generated from the computer. A touch-screen interface is coupled to the computer and operable to enable user control and manipulation of the media content generated by the computer and displayed on the display. A video mixer module is stored in the memory which, when executed by the processor, integrates the images captured by the camera together with the interactive media content generated by the computer as manipulated by the user via the touch-screen interface, and thereby generates the coordinated presentation. The one or more remote devices can receive the coordinated presentation and interact with at least the media content.

In accordance with a further aspect of the present invention, a teleprompter system is provided, including a computer configured by code and operable to generate media content to be displayed on a display, a camera for capturing images of a user and a display coupled to the computer that displays the media content generated from the computer. A touch-screen interface having a transparency positioned intermediate to the user and the camera is positioned such that the camera captures the user's image through the transparency of the touch-screen interface, the touch screen interface being coupled to the computer and operable to enable user control and manipulation of the media content generated by the computer and displayed on the display, and a video mixer is coupled to the camera and is operative to integrate the user's image captured by the camera together with the media content generated by the computer as manipulated by the user via the touch-screen interface.

In accordance with a further aspect of the present invention, a one-way mirror is positioned intermediate to the camera and the touch-screen interface. The one-way mirror is oriented such that it reflects computer generated ("CG") images from the display to the teleprompter user through the touch-screen interface and such that the camera captures images of the teleprompter user through the one-way mirror.

Further, optional aspects for a teleprompter system in accordance with further aspects of the invention include functionality provided by one or more modules executing in a processor of a machine. For instance, a green screen module can be provided which is operable to further configure the computer so as to render at least a portion of the content generated by the computer invisible. Also, a calibration module can be provided which is operable to further configure the computer so as to minimize a mis-registration between the user and the touch screen interface. The calibration module can further comprise a face recognition algorithm executing as part of the code in the computer and operable to determine any movement of the user using the main camera or an optional further camera, with the face recognition algorithm being further operable to dynamically calibrate the touch screen interface in response to any movement of the user. Still further modules can be provided to provide an annotation function that imparts a visual cue to the user on the touch screen interface, or to provide an overlay function to overlay the media content generated from the computer onto the integrated images of the video mixer, or to alter the keystone of the media content generated from the computer and provide the altered content to the overlay module for overlay onto the integrated images of the video mixer, or a combination of one or more of these modules.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

FIG. 3 is a flow diagram depicting the method of certain embodiments of the invention;

WRITTEN DESCRIPTION OF CERTAIN EMBODIMENTS OF THE INVENTION

By way of overview and introduction, the present invention provides several embodiments of systems and methods that enable a coordinated presentation of a live image capture of a person ("user") such as an on-air personality with computer-generated content with which the user interacts during the course of the live image capture. In certain arrangements, as a departure from known teleprompter systems in which the on-air personality reads scripts and views content that is controlled off-camera by a producer and an editorial team, the user of the disclosed system can manipulate the computer-generated content in front of him while the audience looks on. The invention uses a video mixer and various algorithms and modules to enable this arrangement in which the computer-generated content is presented in a plane between the viewer and the on-air personality, rather than behind the on-air personality. This provides a forward-facing experience between the user and the viewers he is facing, as will be appreciated from the further discussion below.

In other arrangements, the above-referenced presentation is delivered to a remote device/player such as a television or a media center, either of which has a processor, a memory, and a connection to a network through which the coordinated presentation can be transmitted. As one non-limiting example, the device/player can be a network-connectable tablet computer such as the iPad made by Apple Computer, Inc. of Cupertino, Calif. The device/player presents the images, computer generated ("CG") content, and potentially producer-selected content, to a viewer, and the viewer can select from among the CG content and instantiate objects, launch applications, and otherwise interact through the same plane as the coordinated presentation, only from the opposite side.

Figure 1:
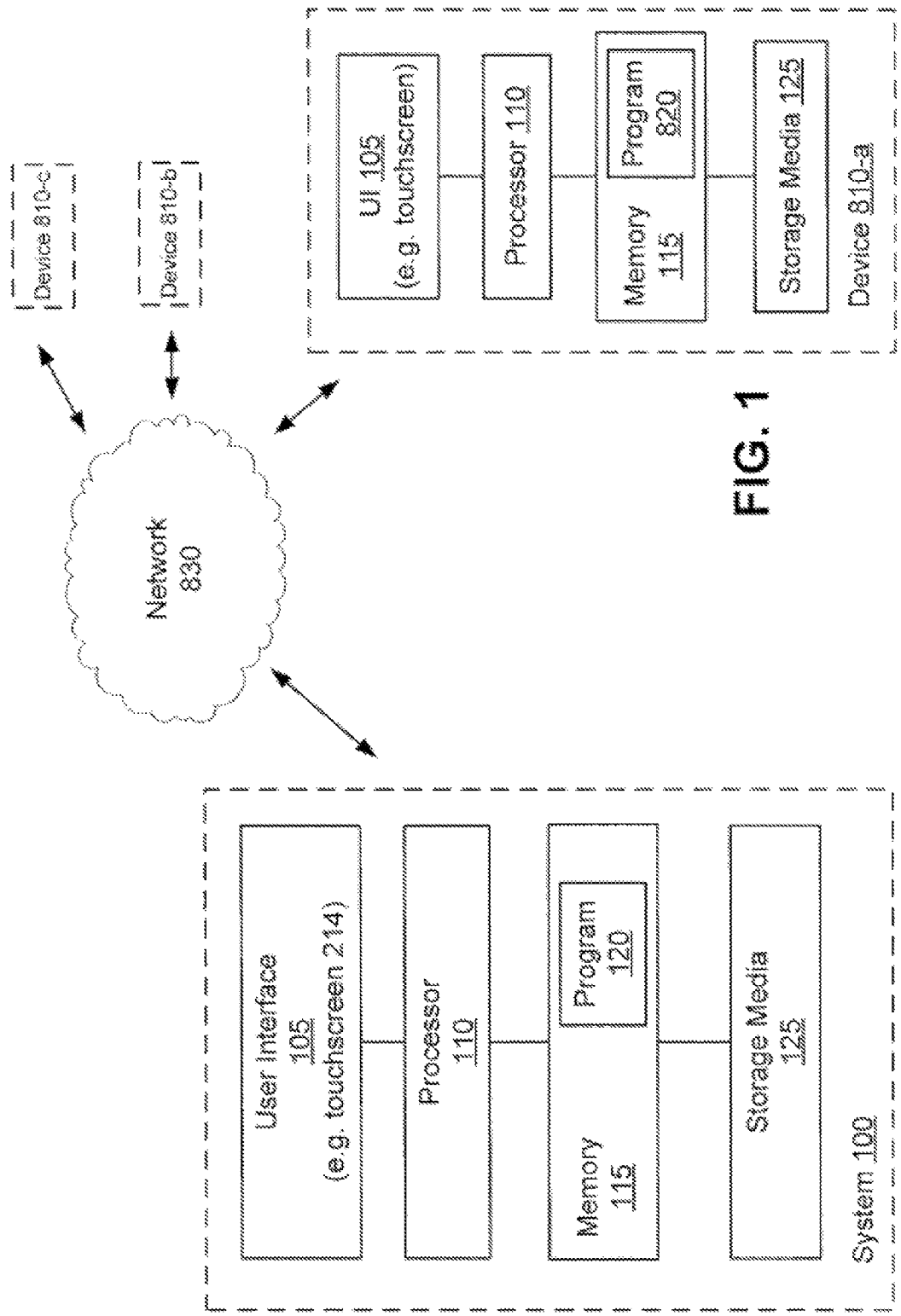
FIG. 1 is a block diagram of a computer system that can be used with certain embodiments of the invention.
Figure 1A:
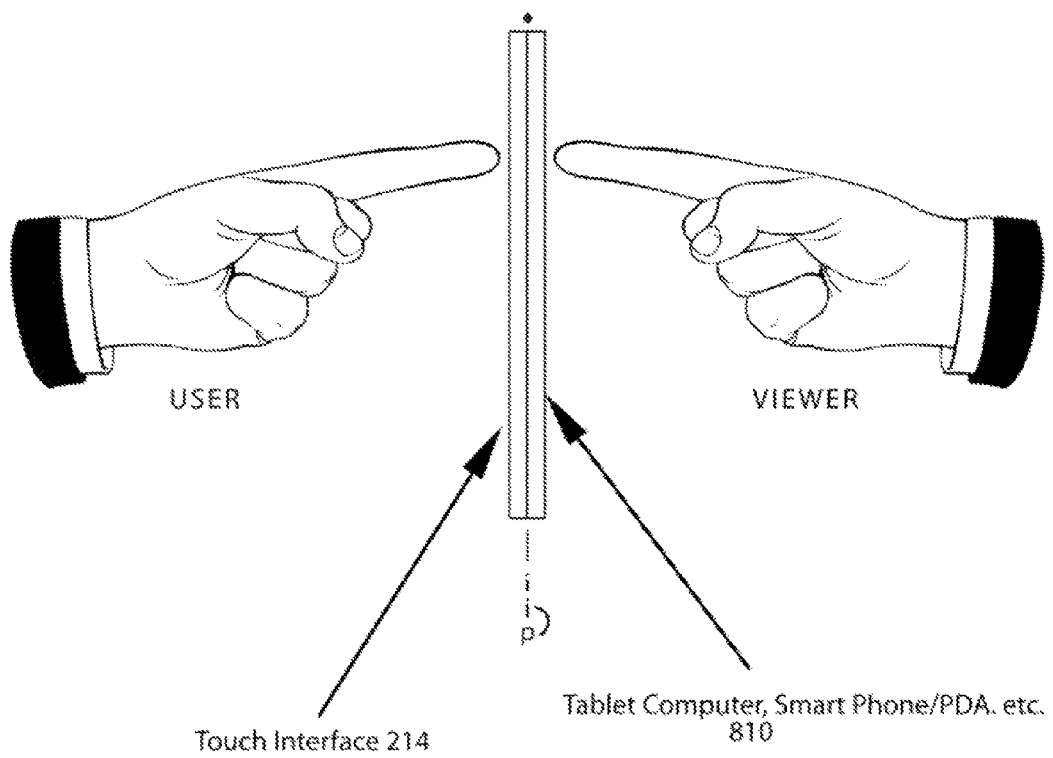

Turning briefly to FIG. 1A, the basic concept of certain arrangements of the present invention is schematically illustrated, upon which the further features and aspects described herein can be configured and implemented in one or more physical embodiments. A user can "curate" content by selecting the content and causing its transmission to one or more viewers, such as in connection with a live broadcast, a computer-based multicast transmission, or a one-on-one transmission between the user and the viewer. The user, such as a personality on a broadcast news or sports show, can speak to viewers and have his or her image captured by a video camera in a conventional manner, and can also interact with computer-generated content presented on a touchscreen interface 214 that is in front of him while an audience of viewers looks on using their respective players (devices) 810. A variety of modules cooperate with one another, as described more fully below, to enable this arrangement in which the computer-generated content is presented in a plane P between the viewer and the user. This provides a forward-facing experience between the user and the viewers he is facing, as will be appreciated from the further discussion below. Moreover, the audience of viewers can interact with the computer generated content by touching the presentation from the other side of the plane P that lies between the viewer and the user (e.g., an on-air personality or any other "curator" who has selected content for presentation to the viewer in the manner described herein). Thus, as shown in FIG. 1A, the curator on one side of the plane P and the viewer on the other side of plane P interact with CG content as though they are each touching the same point on opposites sides of a glass panel, notwithstanding the fact, of course, that the curator is nowhere near the viewer and that the curator can be interacting with potentially a multiplicity of viewers.

The present invention is now described more fully with reference to the accompanying drawings, in which one or more illustrated embodiments of the invention are shown. The invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting the invention, but rather are provided as a representative embodiment for teaching one skilled in the art one or more ways to implement the invention. Furthermore, the terms and phrases used herein are not intended to be limiting, but rather are to provide an understandable description of the invention.

It is to be appreciated that the embodiments of this invention as discussed below may be incorporated as a software algorithm, application, program or code residing in hardware, firmware and/or on a computer useable medium (including software modules and browser plug-ins) that can be executed in a processor of a computer system to configure the processor to perform the functions described below. Such a computer system typically includes memory storage configured to provide output from execution of the computer algorithm, code, or program. An exemplary computer system is shown as a block diagram in FIG. 1 depicting computer system 100. As noted above, in certain arrangements, computer system 100 is used by the curator to combine CG content with a captured image of the user (curator), and several devices 810 are used by viewers to view and interact with the curated content.

Figure 2:
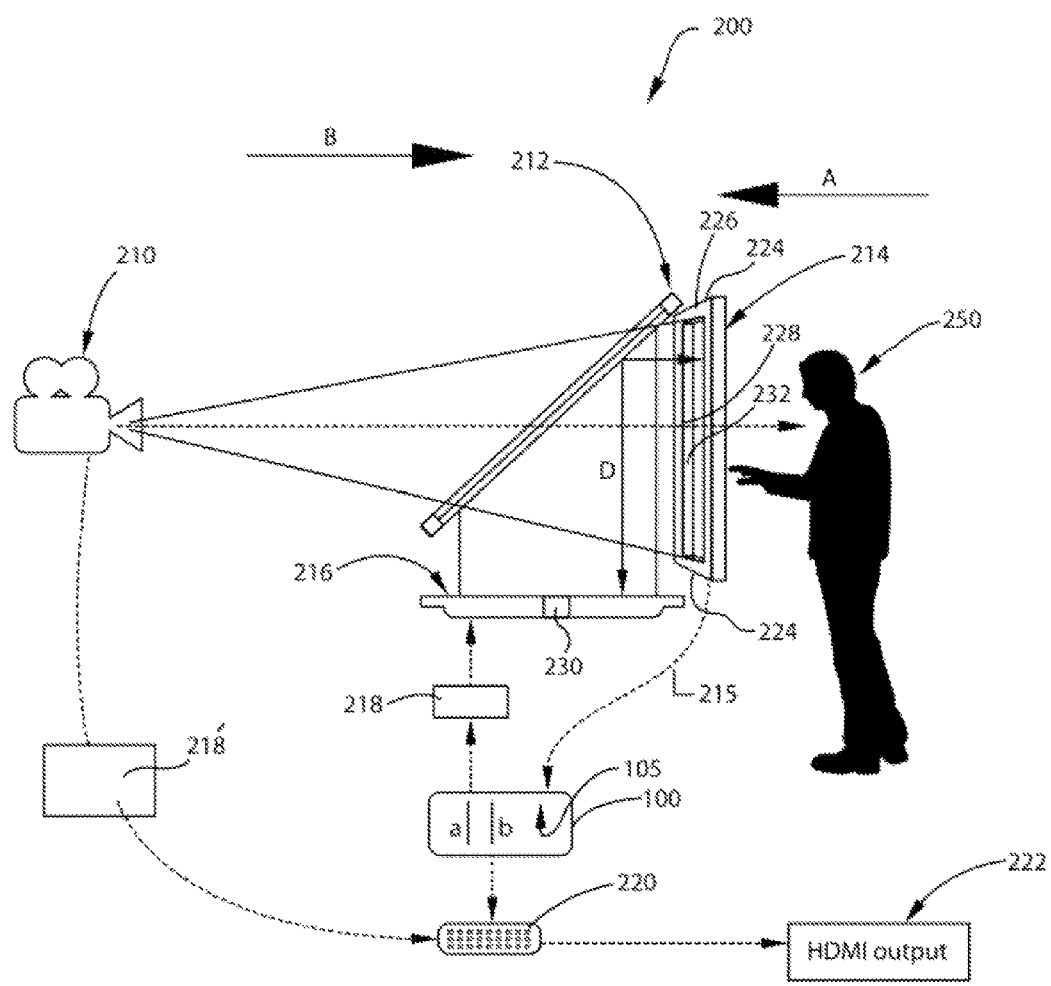
FIG. 2 is a system diagram illustrating system components of one embodiment of the invention.
Figure 6:
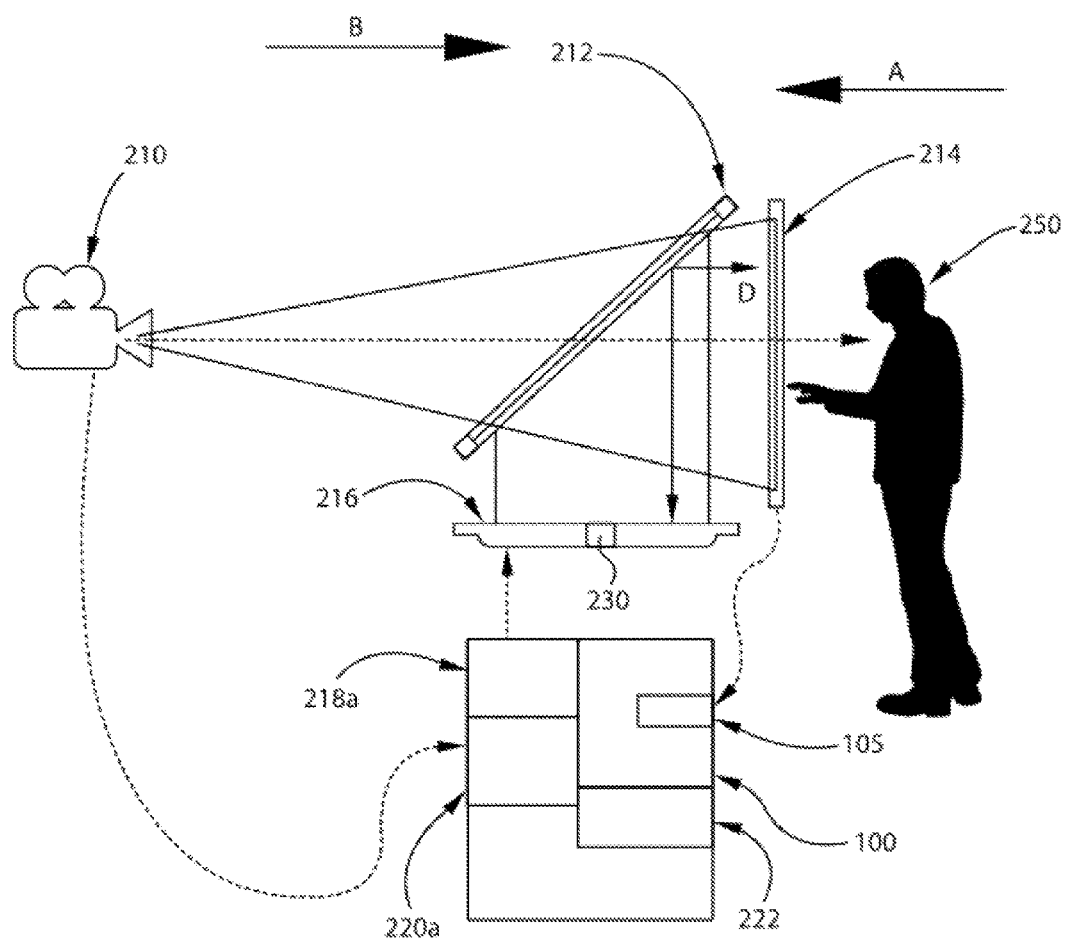
FIG. 6 is a system diagram illustrating system components of yet another embodiment of the invention.

Although system 100 is represented herein as a standalone system, it is not limited to such, but instead can be coupled in certain arrangements to other computer systems via a network 830 (e.g., a local area network or a wide area network such as the internet) or encompass other embodiments as mentioned below. System 100 preferably includes a user interface 105, a processor 110 (such as a digital data processor), and a memory 115. The user interface can comprise a touchscreen interface 214 as shown in the arrangements of FIG. 2 and FIG. 6. Memory 115 is a memory for storing data and instructions suitable for controlling the operation of processor 110. An implementation of memory 115 can include, for example, a random access memory (RAM), a hard drive and a read only memory (ROM), or any of these components. One of the components stored in memory 115 is a program 120.

Program 120 includes instructions for controlling processor 110. Program 120 may be implemented as a single module or as a plurality of modules that operate in cooperation with one another. Program 120 is contemplated as representing a software embodiment, or a component or module thereof, of the method 300 described hereinbelow.

User interface 105 includes an input device, such as a keyboard, touch screen, tablet, or speech recognition subsystem, for enabling a user to communicate information and command selections to processor 110. User interface 105 also includes an output device such as a display or a printer. In the case of a touch screen, the input and output functions are provided by the same structure. A cursor control such as a mouse, track-ball, or joy stick, allows the user to manipulate a cursor on the display for communicating additional information and command selections to processor 110. In embodiments of the present invention, portions of the program 120 including selected modules or code thereof can execute entirely without user input or other commands based on programmatic or automated access to a data signal flow through other systems that may or may not require a user interface for other reasons.

Referring now to FIGS. 1, 2, and 6, in certain arrangements user interface 105 enables a user 250 to communicate information including CG content, and input commands for action by the processor 110 using the touchscreen 214, while the user's image is captured by a camera 210. As described in U.S. Provisional Application Ser. Nos. 61/350,779, filed on Jun. 2, 2010 and 61/370,435, filed on Aug. 3, 2010, both entitled "Teleprompting System and Method" and both incorporated herein by reference in their respective entireties, the camera 210, touchscreen 214, and monitor(s) 216 are arranged relative to one or more mirrors 212 to cause CG content to appear in the plane between the user 250 and the camera 210. This arrangement is advantageous because the user 250 is facing the camera while interacting with the content. Other implementations can be had in which there is no teleprompt rig 200 as shown in FIG. 6, such as using a suitably adapted application program executing on a more compact computer system 100. For instance, modifying the Facetime application available from Apple Computer, Inc. can result in a camera facing a touch screen with which a user can interact and provide curated content in a different setting than described as the principal example in this document. The key point in this regard to appreciate is that the present invention has applicability in applications other than teleprompting, and that the embodiment of FIG. 6 is merely illustrative of one application of the disclosed invention.

Part of the user interface 105 is an output device such as a display (monitor 230). Using the touchscreen interface 214, the user can manipulate objects and cause them to be displayed on the monitor 230 or cause objects to be generated by the computer 100. Meanwhile, because of the one-way mirror 212, the camera only captures the user's image. The term "one-way mirror" refers to a mirror that is partially reflective and partially transparent, such as may be provided by a partially-silvered lens blank. Such a mirror exhibits the property of allowing viewing through the mirror from a darkened side but not from a brightly lit side. Such mirrors are also referred to in the art as a one-way glass or a two-way mirror.

While program 120 is indicated as already loaded into memory 115, it may be configured on a storage media 125 for subsequent loading into memory 115. Storage media 125 can be any conventional storage media such as a magnetic tape, an optical storage media, a compact disc, or a floppy disc. Alternatively, storage media 125 can be random access memory (RAM), or other type of electronic storage, located on a remote storage system, such as a server that delivers the program 120 for installation and launch on a user device. As one non-limiting example, the program can be located on a device located remotely, but on a network to which the system 100 is in communication.

It is to be understood that the invention is not to be limited to such a computer system 100 as depicted in FIG. 1 but rather may be implemented on a general purpose microcomputer incorporating certain components of system 100, such as one of the members of the Sun® Microsystems family of computer systems, one of the members of the IBM® Personal Computer family, one of the members of the Apple® Computer family, or a myriad of other computer processor driven systems, including: workstations, desktop computers, laptop computers, netbook computers, an iPad™ or like tablet device, a personal digital assistant (PDA), or a smart phone or other like handheld devices.

FIG. 1 further illustrates several devices 810-*a*, 810-*b*, 810-*c* (more generally, device 810) connectable, according to certain arrangements, through a network 830 so as to receive content distributed from the computer system 100. An arbitrary number of devices 810 can connect to the system 100 or to other machines that distribute content output by the system 100. Device 810-*a* is shown in detail, and the components of each device 810-*b*, etc. can be the same. The aforementioned iPad is one example of a product that is suitable as being the device 810 as it includes the specified components for device 810-*a*, as shown in FIG. 1.

One distinction between the system 100 and the devices 810 is that the computer system 100 is configured, in certain arrangements, to permit the user 250 to curate the content. In other words, in certain arrangements the output of the computer system 100 can include a combination of an image of the user 250, any CG content that the user has selected for the viewer to see, and any further content that a producer may have selected to accompany the output. Moreover, there can be further data (e.g., one or more URLs and associated parameters) that are output by the computer system 100, as described below. Meanwhile, the devices 810 have a program 820 that comprises code or instructions that are executable in the processor 110 of the device, and which may be implemented as a single module or as a plurality of modules that operate in cooperation with one another. The program 820 enables viewing of the combined content output by the computer system, either through a network connection to the computer 100 or via another server that supports one to a multiplicity of devices 810. The program 820 further enables interaction by the viewer with the CG content, using the further data mentioned above, by touching and/or otherwise interacting with the curated presentation using the user interface 105 of the device 810. The program 820 is able to process any further data such as URLs that may accompany the output from computer system 100 and cause or enable further actions at the device 810. As a result, the curator/user 250 can touch the interface 214 from one side so as to select content for consumption by viewers, while up to a multiplicity of viewers can touch the opposite side of the interface to instantiate, launch, or otherwise interact with such content. The viewer experience, therefore, integrates the broadcaster/curator with interactive participant viewers.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules, being executed by a computer. Generally, program modules include routines, programs, objects, components, data structures, etc., that perform particular tasks or implement particular abstract data types.

With the exemplary computing system environment 100 of FIG. 1 being generally shown and discussed above, the method and system of the invention in accordance with illustrated embodiments will now be discussed. It is to be appreciated that the method described herein has been indicated in connection with a flow diagram for facilitating a description of the principal processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

With further reference to FIG. 2, depicted is an embodiment of a teleprompter system according to certain arrangements, designated generally by reference numeral 200 in accordance with the illustrated embodiments. System 200 includes a camera 210, such as a High Definition (HD) camera commonly used by studios for producing television media. The camera can take on a variety of forms and its particulars are not material to the present invention; the only requirement of the camera is that it have a signal output that can be provided to a video mixer 220, though it is desirable to have a synchronization signal included in the signal output of the camera that can be used to synchronize the output of the camera with any CG content (FIG. 3, step 340) and any producer-provided content (FIG. 3, step 345).

In the embodiment illustrated in FIG. 2, disposed between camera 210 and a teleprompter user 250 (such as a news or sports broadcaster) is a one-way mirror 212 preferably angled at an acute angle relative to the user 250.

As one non-limiting example, in certain arrangements the one-way mirror 212 can comprise a 50/50 beam splitter which transmits half of the light that impinges upon it from either its rear surface or its front surface, or can comprise a 80/20 beam splitter that transmits a greater portion of light through the mirror 212 (80%) than is reflected off of the surface facing the user (20%). The transmission characteristic for the mirror 212 can be selected to optimize design criteria which represent a tradeoff between having computer-generated content presented to the user as a bright reflection off of the front face of the one-way mirror 212 versus the camera 210 capturing a bright image of the user standing under camera lights.

Another criteria to be considered is whether additional one-way mirrors are utilized in the light path (as described below), as such further mirrors, if utilized, reduce the amount of light transmission in the path.

System 200 further includes, in certain arrangements, a touch screen interface 214 coupled to the user interface port 105 of the computer system 100, preferably in front of the one-way mirror 212, relative to the teleprompter user 250. A monitor 216 is preferably mounted out of the site-path of the camera 210, such as beneath the one-way mirror 212, above the one-way mirror 212, or to one side or another of the one-way mirror 212. The monitor 216 is coupled to computer system 100, preferably via a DVI inverter 218, as will be further explained below.

Optionally, a hood or barrier 224 can be positioned to at least partially block the user's view of the monitor 216 through the touch screen 214. The barrier 224 can be an opaque element and/or a mirror.

As illustrated in FIG. 2, coupled to computer system 100 and camera 210 in certain arrangements is a video mixer device 220 for mixing together the video output from both the camera 210 and computer system 100, as further described below. The output of video mixer device 220 is preferably coupled to a media output port 222, such as an HDMI output port, for media distribution thereof. It should be understood that in certain arrangements, such as that depicted in FIG. 6, the functionality of video mixer device 220 can be performed by one or more executing computer programs and/or applications, such as video mixer 220a.

It is to be appreciated that in certain arrangements camera 210 is preferably mounted on a rig mounting the one-way mirror 212, the touch screen interface 214 and the monitor 216 such that the camera 210 is hooded adjacent the one-way mirror 212. The display 216 and the touch screen interface 214 are spaced from one another at a distance D, and this distance can result in mis-registration between locations on the monitor and their apparent position in the plane of the touch screen interface. In particular, the distance D makes the monitor appear smaller in the plane of the touchscreen, and so points on the monitor can be offset from points on the touchscreen 214. One way of accounting for the offset is to train the user 250 to compensate for the offset by touching a different location on the touchscreen 214 than presented on that screen to manually account for the offset. This technique requires some training for the user to become accustomed to the mis-registration issue. Another way of accounting for the offset is to use a calibration engine as described hereinbelow. Still another way is to increase the size of the monitor 214 relative to the touchscreen (and the mirror 212) in order to allow the monitor to fill the full expanse of the touchscreen plane 216. An array of monitors can be used rather than one large one, but this solution is associated with increased cost and size of the rig, and is less preferred. As will be understood, a combination of these approaches can be used in a given implementation.

The video mixing functionality can be provided by a standalone video mixer that is coupled to an output of the camera 210 and to an output of the computer. In the embodiment of FIG. 6, the computer system 100 includes modules that implement, in code, the functionality of an inverter 218 and a video mixer 220. The inverter module is useful because the images presented on the monitor 216 are typically inverted because they first reflect off of a one-way mirror 212 so as to appear in the proper orientation relative to the user 250. In particular, an inverter module 218a includes code that executes in the computer 100 so as to configure the processor to re-map at least a portion of the normal video output of a computer in reverse and/or upside down. As such, the re-mapped portion can include any CG objects created or otherwise presented by the computer 100. Meanwhile, a teleprompt script can be retained in normal-video output orientation and served by the computer 100, if present and if desired. The inverter module 218a can include code that implements a video driver to drive the re-mapped video signals to the monitor 216. In this way, the inverted video output can be provided to the monitor 216 while a normal video output is available at another port for connection to a monitor that is viewed by persons other than the user 250. Alternatively, the inverter module 218a is provided to a video processing chip of the computer system 100 as the video output of the computer.

Figure 7A:
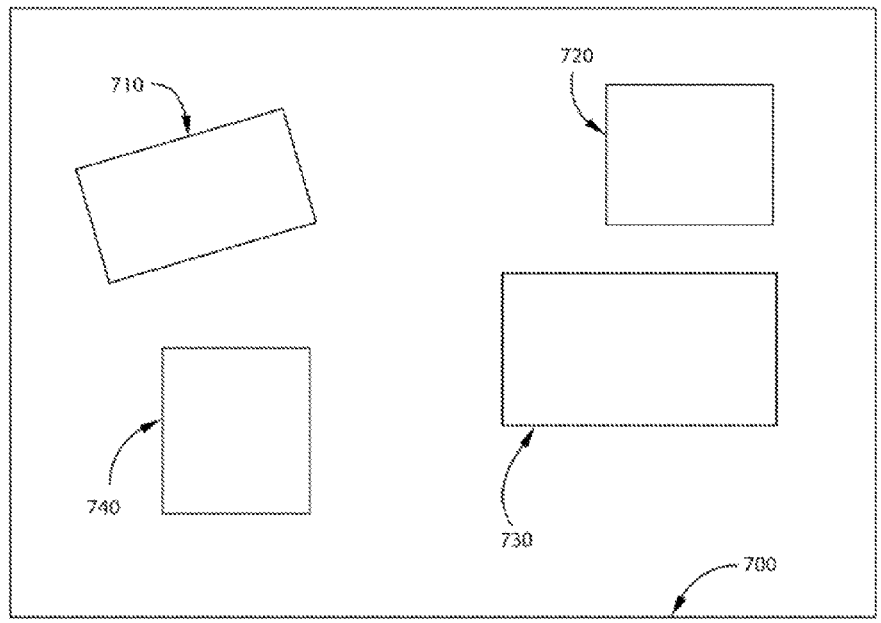
FIG. 7a is a schematic diagram showing a desktop image.
Figure 7B:
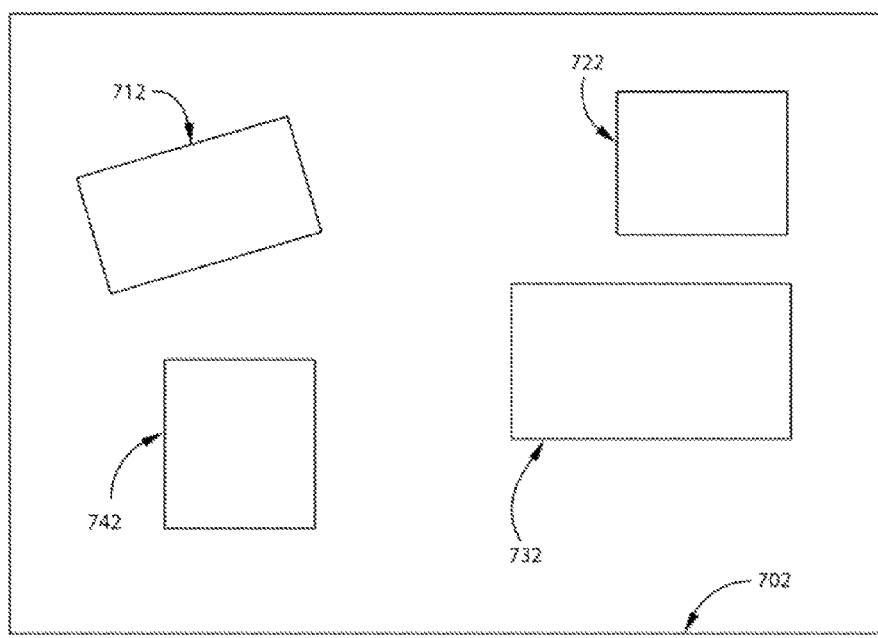
FIG. 7b is a schematic diagram showing a transparency map.

The video mixer module 220a includes code that executes in the computer 100 so as to configure the processor to mix the normal video signals of the computer (and not the output of the inverter module 218a) together with the video output of the camera 210. The camera output is received at an input port of the computer 100, for example an HDMI port, and is mapped so as to retain the fidelity of the image as an array of digital picture elements. The output of video mixer device 220 is preferably a combination of signals from the camera 210 and the computer 100. The manner of mixing the signals by the video mixer module 220a to provide the combination can be varied. One algorithm for mixing the signals is a binary combination of the CG content in any graphical objects created by the computer at a given moment in time with the mapped array from the camera at that same moment in time. This mixing can result in the CG content being arranged in the foreground as an overlay in front of the image of the user 250 captured by the camera. Such an output can be facilitated by passing the CG content through a green screen module that achieves this binary substitution of the content of one pixel wherever the desktop image as the target color (here, green), and then combining the array derived from the camera output with the filtered CG content. This green screen module, therefore, substitutes the camera image of the user 250 wherever there is "green" on the desktop image. Another algorithm for mixing the signals utilizes data in an alpha channel (an "alpha map" or "transparency map") to obtain settings concerning the degree of transparency, or, conversely, the opacity, of each individual CG content that is being created by the computer at a given moment in time and superimposing the array derived from the camera output with all of the computer output in accordance with the alpha map. As understood in the art, the alpha channel provides metadata associated with the CG content that defines, on a grey scale, say, from 0 to 255, the transparency or opacity that is to be assigned to a given object. The alpha channel comprises data in the computer and associated with the various CG objects that are to be displayed by the computer 100 or that is associated with the entire desktop image. As such, as shown in FIG. 7A, the desktop image 700 can include several objects such as a temperature widget 710, a streamed video player 720, a document 730, and a picture 740, whereas an alpha map as shown in FIG. 7B includes a transparency value 702 for each pixel on the desktop, including values 712, 722, 732, and 742 associated with respective objects 710, 720, 730, and 740. The alpha map data is accessed from a memory or other data store and utilized by the video mixer module 220a to transform the CG content into objects that can be presented over the mapped array from the camera, in corresponding pixel locations. The computer 100, therefore, can provide CG content with associated alpha map values to the video mixer 22a for combining with images provided by the camera. The combined signals from the video mixer 220a are provided to a media output port 222, such as an HDMI output port, for media distribution thereof. The media distribution can be a broadcast, multicast, or unicast transmission of the resulting image array to an audience of one or many viewers.

It should be understood, with regard to the embodiments of FIGS. 2 and 6, that the teleprompt scripts can be projected and/or displayed on touch screen interface 214 using one or more teleprompting applications and/or modules such that the user 250 can read them, as described above, however these scripts are preferably not transmitted and/or viewable by viewers of the generated content.

With the components of the present invention teleprompter system 200 identified above in accordance with the illustrated embodiments of FIGS. 2 and 6, their method of use will now be described with reference to method 300 as depicted in FIG. 3 (and with continuing reference to FIGS. 2 and 6). Starting at step 310, with the teleprompter user 250 preferably positioned in front of touch-screen interface 214, the camera 210 captures the user's 250 image through the one-way mirror 212. The teleprompter user 250 is preferably not able to see the camera 210 but instead views the reflected display of the monitor 218 via the one-way mirror 212 (step 320).

The computer system 100, preferably under the control of a producer, causes images to be displayed to the teleprompter user 250, via the computer controlled monitor 216 and one-way mirror 212 (step 330). It is noted in regard to the embodiment of FIGS. 2 and 6 that since the one-way mirror 212 will cause images displayed on the monitor to be inverted (that is, have the image displayed horizontally reversed and/or upside-down), the DVI inverter 218 coupled intermediate to the computer system 100 and the monitor 216 will first invert the images output from computer system 100 such that when the images are again inverted by the one-way mirror 212, they will appear in the proper orientation relative to the teleprompter user 250. It is to be appreciated the user 250 is able to view the reflected computer generated images on the one-way mirror 212 since the touch screen interface 214 is preferably formed of a clear (that is, substantially transparent) display.

In other arrangements, the computer system 100, preferably under the control of a producer, causes images to be displayed to the teleprompter user 250, via the computer controlled monitor 216 and one-way mirror 212 (step 330). It is noted in regard to the embodiment of FIG. 6 that since the one-way mirror 212 will cause images displayed on the monitor to be inverted (that is, have the image displayed horizontally reversed and/or upside-down), the inverter module 218a intercepts signals generated by the computer system 100 representative of the desktop image and inverts that desktop image so that when optically inverted by the one-way mirror 212, the desktop image will appear in the proper orientation relative to the teleprompter user 250. It is to be appreciated the user 250 is able to view the reflected computer generated images on the one-way mirror 212 since the touch screen interface 214 is preferably formed of a clear (that is, substantially transparent) display. The rig 200 of FIG. 6 can include further features such as a non-reflective coating or non-reflective glass panel positioned to reduce any ghost images as described below.

In certain arrangements, the CG images reflecting off of the mirror 212 have a brightness that can reflect off of the side of the interface 214 that faces the camera and create a "ghost" image of the CG image that is reversely oriented from the camera's vantage point. In order to minimize this effect, a non-reflective coating 226 can be included on the camera-facing side of the interface 214. Alternatively, if a non-reflective coating is desired, it can be applied to a free standing, transparent panel, such as a glass sheet 228, which is positioned in the light path between the mirror 212 and the interface 214. If the glass panel 228 is used, it is preferably mounted within a hood, such as can be defined by the barrier 224, so that there is no extraneous light between the glass panel 228 and the interface 214.

The touch screen interface 214 can include touch capacitive switches that capture a teleprompter user's 250 touch, and code such as an algorithm that executes on computer 100 so as to determine the X,Y coordinates of the user's touch (relative to the computer controlled monitor 216). In this way, the user can manipulate and control the display of a computer 100 in the same way that a computer mouse can be used to provide a machine with coordinate information for controlling an operation. The touch-capacitive switches can comprise a transparent conductor such as indium tin oxide which can be used to form an array of transparent capacitive switches. In a different implementation, the touch screen interface 214 can include an optical position sensing circuit that operates in conjunction with code that executes in the computer 100 to detect and respond to the user's having interrupted orthogonal beams that pass in front of and across a plane of the touch screen interface. For instance, infra-red light sources can be positioned to emit beams in a plane across the surface of the touch screen interface, and the algorithm can triangulate and determine the position on the touch screen at which the interruption occurred in a conventional manner. Examples of such an infra-red device are the series of Touch-Kit touch control products produced by TouchKit, Inc. of Guangzhou, China.

As shown in FIG. 2, a user interface port 105 of the computer system 100 is coupled to the touch-screen interface 214, whereby the teleprompter user's 250 hand movements on the touch-screen interface 214 controls the functionality and images created by or provided by the computer system 100. Thus, the teleprompter user 250 is able to control and manipulate the computer generated media content displayed by the monitor 216 as generated by computer system 100 by hand gesture movements imparted on the touch-screen interface 214 (step 340). Each touch of the touch screen interface or gesture within the plane of its sensors causes a signal 215 to be sent to the computer system 100. The signal is processed at step 340 so as to determine the location(s) of the touch or gesture, and the locations so-determined are then used to select content or otherwise give effect to the user's action (e.g., the user may have selected a hyperlink, resized a picture, moved an image, and so on).

Optionally, the user can control the transparency of a given CG object to highlight or de-emphasize one or more objects presented on the interface 214 that are mixed into a transmission to the viewer(s). To control the transparency, the computer 100 includes a module that tracks the object with which the user 250 is interacting, and changes the alpha map associated with that object when the user commands such a change to the object. For instance, the command can comprise sensing three touchpoints on a single object followed by a rotation gesture. A rotation gesture in one direction following such a multi-touch by the user can comprise a command to increase the transparency of an object that the user wishes to de-emphasize. Likewise, a rotation gesture in the opposite direction following a multi-touch action by the user can comprise a command to decrease the transparency (increase the opacity) of the touched-object so that the user 250 can make that object more prominent in the transmission to the viewer. At the same time that such a gesture is processed, the CG object on the desktop of the computer 100 becomes more or less opaque, as the case may be. Meanwhile, the alpha map associated with that object has its properties modified to change the transparency/opacity values for the object in coordination with the gesture. The video mixer 220, 220a (discussed below) can thereafter combine the mapped camera image and the so-modified CG object into a combined signal for distribution to viewers.

Optionally, in certain arrangements the system 200 further includes a calibration engine that executes in a processor 110 of the computer system 100 and is operative to accommodate registration issues between the display 216 and the touch screen interface 214. In particular, the display 216 and the touch screen interface 214 are spaced from one another and that distance D (as shown in FIGS. 2 and 6) can result in the signal processing at step 340 determining a location that is slightly different than that intended by the user, resulting in adverse consequences such as the computer system presenting content in response to step 340 that was not intended to be displayed. If the user is using the system 200 in a real-time production, this can result in great problems. Even if the display 216 and the touch screen interface 214 are precisely in alignment, the effect of misregistration can result, due to the spacing D, simply as a result of a difference in height or lateral position of the user. To accommodate calibration issues, the calibration engine preferably comprises a set of tools that compensate for one or more misregistration issues. In part, the calibration engine can comprise an algorithm, application and/or module that is executed before the broadcast goes live to have the user touch certain locations of the touch screen interface 214, such as the corners, in order to account for a dominant eye that the user may have. The user is prompted to touch such locations, and as a result an offset is computed. The offset is a horizontal and vertical adjustment that, when added or subtracted to a coordinate location on the interface 214, or when multiplied/divided out of the value of such coordinate location, corresponds to the same location on the monitor 216. Thus, the offset can be used by the computer to convert a touched point on the interface 214 into a translated location that corresponds to an associated point on the monitor 216.

The calibration engine can comprise additional algorithms, applications and/or modules that execute in the processor of the computer system 100 throughout the broadcast session that are operative to correct for height and lateral position of the user. For example, the algorithms utilized for this purpose can include the faceapi face-recognition routines available under license from Seeing Machines, Inc. of Acton, Mass. Such a face recognition routine can comprise a module that executes on a processor of the computer system 100 and cooperates with one or more cameras 230 that are positioned so as to capture an image of the user and provide that image to the face recognition routine. The routine operates to identify the user's face relative to the touch screen interface 214 and thereby provide information to ensure better registration between what the user selects and true locations on the display 216. The module can dynamically correct for misregistration in response to any movement by the user throughout the broadcast session.

It is noted that the video captured by camera 210 only includes that of the teleprompter user 250 and does not include the aforesaid computer generated media since the teleprompter user 250 preferably only views a reflected image of the computer generated media via the one-way mirror 212. In certain arrangements, the video mixer 220 receives as inputs the images captured by camera 210, the computer-generated, user-manipulated media content from computer system 100 (or a URL and parameters relating thereto), and any further content, links and/or metadata (including URLs and parameters relating thereto) that a producer may wish to include (from step 345). These materials are integrated into a common media output file (or data stream) via a media output port, such as a HDMI output port 222 (step 350). In other arrangements, The video mixing module 220a, however, receives as inputs the images captured by camera 210 and the signals generated by the computer for presentation in the desktop image based on the user's 250 manipulations of content, and integrates them into a common media output file (or data stream) via a media output port, such as a HDMI output port 222 (step 350). Preferably, a synchronization signal is in the signal output of the camera that can be used to synchronize the output of the camera with any CG content (step 340) and any producer-provided content (step 345). Before doing so, however, a green-screen module executing in a processor (such as within the mixer 220 or elsewhere) can be invoked to operate on at least a portion of the media content from the computer system 100 (which content is to be combined in the output file or data stream so as to be in a plane that is in front of the user) so as to make that portion invisible and thereby permit viewing of the image from the camera 210 where that portion overlaps the camera image. As described above, the green-screen module can have the objects of interest in the computer-generated content appear within the output stream or file while the remainder is filtered out to reveal more of the user or the backdrop of the broadcast set where the user is located. For example, the desktop image can be set to a prescribed color (e.g., "green"), and wherever that color appears, the mixer passes through the signal from the camera 210. Thus, CG content on the desktop can be made to float in place of or in substitution for the image captured by the camera of the user 250 by employing the green screen module.

In one implementation, the green-screen module can implement an alpha map, namely, a transparency of the overlaying image, as understood in the art.

The media from the output port 222 is ultimately caused to be displayed on a viewer's device 810 having a display screen, such as a television, computer monitor, smart phone (e.g., iPhone), tablet device (e.g., iPad™), and the like (step 360). In certain arrangements, the video captured from the camera 210 and the user manipulated computer content are combined into a composite stream (such as by superimposing one upon the other), via the video mixer device 220 (or video mixer module 220a, discussed below; collectively, more generally, mixer 220). In other arrangements, the video captured from the camera 210 and the user manipulated computer content are combined with one another, via the video mixing module 220a, and are output to the network 830. Optionally, the output can be accompanied by further data and/or metadata such as one or more URLs and associated parameters to enable further functionality and guided user interaction at the viewer device 810, as described below.

An artifact of the arrangement illustrated in FIG. 2 is that the audience that views the media output as a broadcast stream or file is viewing the computer-generated, user-manipulated content from the opposite direction of the on-air personality. In other words, the on-air personality (the "user") is looking at the touch screen interface 214 and the computer-generated content while facing in the direction of arrow A in FIGS. 2 and 6 whereas the audience of viewers (each one being a "viewer") is watching the on-air personality and seeing the computer generated content while facing in the direction of arrow B in FIGS. 2 and 6. The on-air personality is interacting with a display that is in front of him, yet the personality must interact with a horizontally-reversed image provided by the DVI inverter 218 to ensure that the viewing audience can perceive the computer-generated content with the correct orientation. The horizontally reversed image creates difficulties for the user to interact with the content in a way that is meaningful to the viewer because text and images that that the user sees via the touch screen interface 214 are all reversed compared to what the viewers see. As a result, if the user points to a location on the content, the location that he points to does not correspond to the locations that the viewers see, and the impression that a viewer gets is that the on-air personality does not know where the relevant content is on the screen. Meanwhile, the display 216 provides teleprompter feeds to the user that are in a normal orientation so that the on-air personality can read a script to the viewing audience, but any of the computer-generated content from the computer system 100 is reversed and pointing to that content can result in difficulties for the on-air personality. The difficulties are particularly keen when the on-air personality interacts with the computer-generated content using a gesture such as dragging content from one position on the screen 214 to another; the viewer sees the content in a reverse arrangement, and so the impression to the viewer is peculiar, absent one of the solutions described next.

One non-technical solution is to train and require the user to reverse his behavior, which is difficult to do correctly or consistently. Another straightforward solution is to reverse the captured image of the on-air personality from the camera 210, so that it can be combined with a normal stream of the computer-generated content by the video mixer 220 and have the images combined correctly. This solution requires that an L-R inverter circuit 218' be inserted in the path between the camera 210 and the video mixer 220 (or video mixer module 220a). Such an inverter circuit flips the video image so that the right side of the image is transformed to the left side of the image, the left side of the image is transformed to the right side of the image, and all parts in between are similarly switched. There are undesirable implications here, such as the fact that any asymmetrical features of the on-air personality, including his or her wardrobe, will be horizontally reversed which may be unacceptable. A further issue that arises in this arrangement is that only a single camera can be used or else the image of the on-air personality will flip back and forth as cameras are changed.

To address this issue, embodiments of the invention optionally can include an annotation module executing in the computer system and operative to impart, as a layer separate from the computer-generated content, an indication of the relevant portion in the content to be pointed to as perceived when viewed from the viewer's vantage point. In particular, a producer or editor uses the annotation module to mark locations in the normal computer-generated image that are transposed as a separate layer onto the horizontally-reversed image. The annotation module preferably causes these marked locations to be directed to the display 216 but not to the video mixer 220, and as a result, provide visual cues to the on-air personality on the touch screen display that are not seen by any of the viewers of the broadcast. As such, the annotation module can provide marks (e.g., dots, words "touch here", drag from here to here, etc.) that the on-air personality sees in normal, non-reversed text and can respond to so as to more gracefully manipulate the reversed images of the computer-generated content in an interactive manner during the broadcast. In addition, the teleprompter script can be coordinated (synchronized) with the annotations to direct the user accordingly ("In Bagdad, armed forces [POINT TO ANNOTATION B] advanced against insurgent . . . ").

Figure 2A:
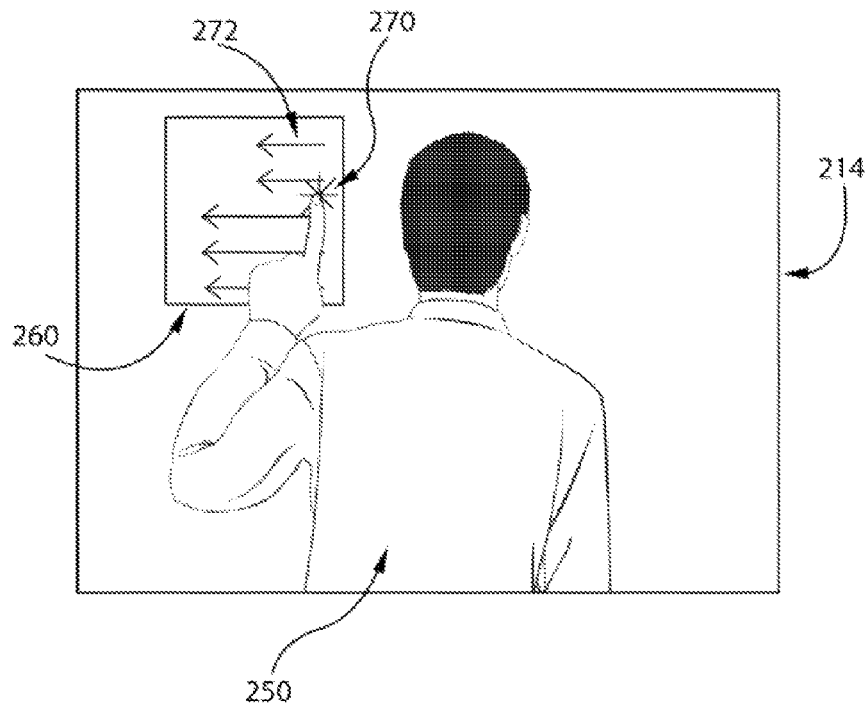
FIG. 2A is a front, plan view of the touch screen interface showing content in relation to an on-air personality.
Figure 2B:
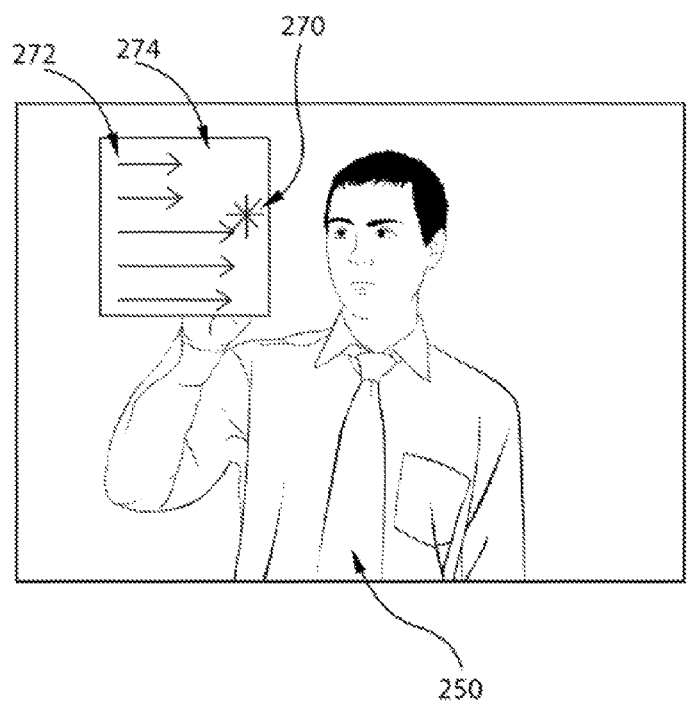
FIG. 2B is a rear, plan view of the touch screen interface of FIG. 2A.

Referring briefly to FIG. 2A, a plan view of the touch screen interface 214 shows content 260 in the form of a document that the user 250 has called up onto the interface. The user 250 is facing into the paper toward the interface 214 and pointing to a visual cue 270 within the content 260. The text in the document that comprises content 260 in this illustration is rendered backwards on in the interface 214, as indicated by the arrow heads pointing to the left. In FIG. 2A, the user is pointing to the visual cue 270 which is on the left side of the document image, alongside text 272. In FIG. 2B, the viewer's perspective has the viewer seeing the on-air personality's face, and seeing the on-air personality pointing to the text 272. The visual cue 270 provides an assist to the user that is not seen by the viewer. The assist guides the user to point to a desired location within the content 260 rather than to, say, a blank region 274. Yet, if the user had pointed to the reversed text 272 in FIG. 2A, the viewer would perceive the on-air personality as having difficulties because the corresponding portion on the non-reversed image is blank (region 274). The annotation module helps the user more graciously locate desired content within a reversed image. Among other things; this can be helpful during real-time broadcasts.

Optionally, a second one-way mirror 232 can be positioned behind the touchscreen interface 214 (relative to the user 250), and between any anti-reflection panel 228 and the touchscreen interface 214. The second mirror 232 is parallel to the touchscreen interface 214. Because the CG content from the monitor 216 is bright, including any teleprompt scripts, such content and scripts reflect off of the first one-way mirror 212 and pass through the second mirror 232 and are directly viewable by the user 250. Meanwhile, the remainder of the second mirror 232 is not comparably illuminated (the rig including the mirror 212, touchscreen interface 214, and monitor 216 are preferably shielded from extraneous light) and so the CG content and script appear to float within the mirror 232 as illuminated objects that are moveable, rotatable, and resizable, while the user 250 sees his/her reflection within the second mirror wherever such content/scripts are not being presented.

Figure 4:
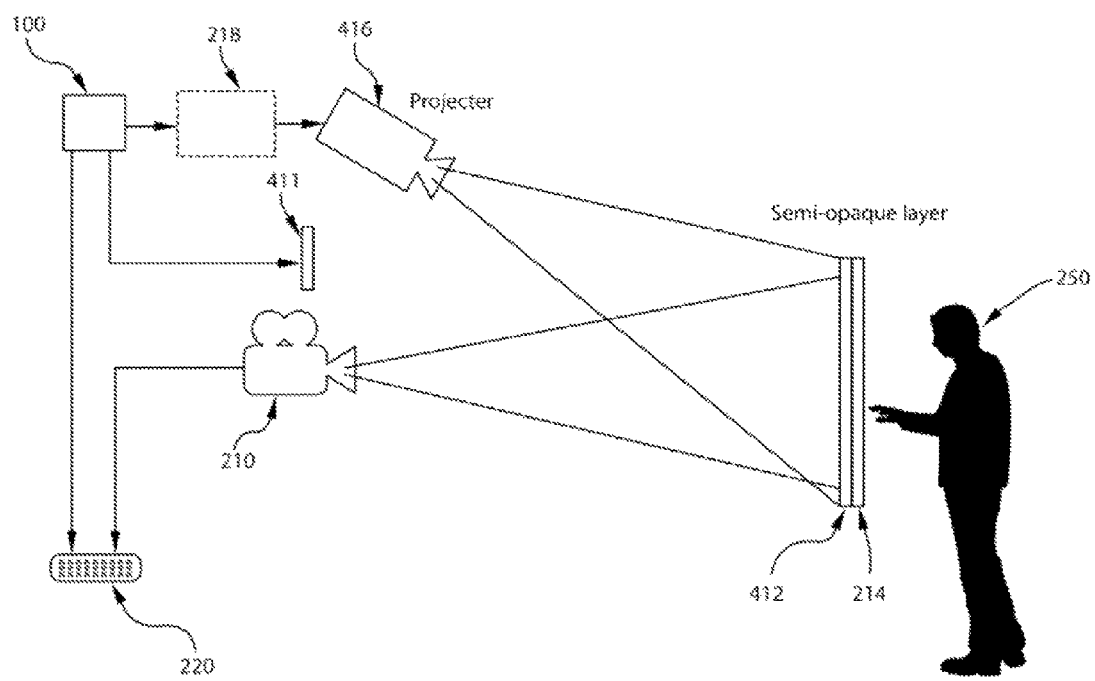
FIG. 4 is a system diagram illustrating system components of another embodiment of the invention.

Referring now to FIG. 4, system components of another embodiment of the invention are illustrated in which like components to the system of FIG. 2 have corresponding reference numbers. This arrangement has a projector 416 connected to the computer system 100, optionally via DVI inverter 218. The projector 416 shines on a semi-opaque layer 412. For example, the opaque layer can preferably be up to about 5% white opaque to provide a faint image on which the computer-generated content can be presented. (The system of FIG. 4 can be hooded so that it is dark and the image projected by the projector 416 is more easily seen by the user.)

The user 250 sees that content and can interact with it, all while receiving teleprompter guidance from a teleprompter 411. A camera 210 points toward the user 250, and so does the projector 416. As such, both the camera and the projector have the same vantage point, which essentially requires that the user 250 interact with a reversed image. Alternatively, the computer image can be inverted (that is, horizontally reversed), and the camera output reversed to provide the mixer with a correct-orientation of the computer-generated output, albeit with a horizontally-flipped image of the on-air personality (assuming that is an acceptable result). The output of the camera and the CG content from the computer system are combined at the video mixer 220, which can digitally combine (for example, using superimposition) a copy of the computer-generated content to make the content more visible than may be captured as a reflection off of the opaque layer 412 (which has a ghost-like, wispy appearance).

Figure 5:
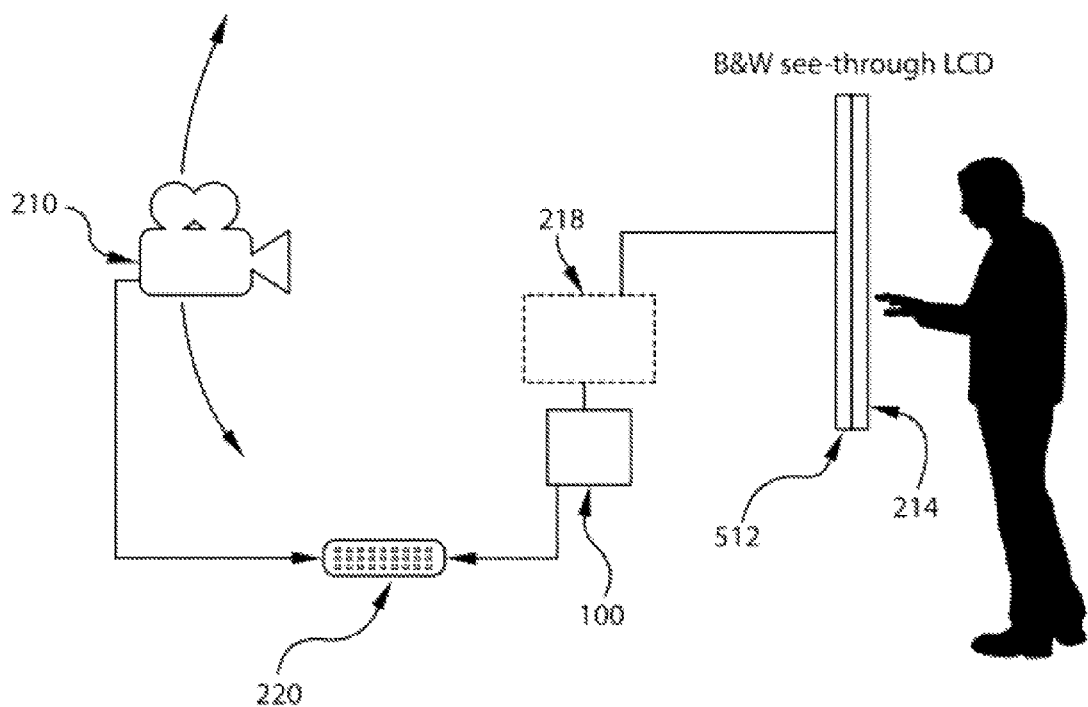
FIG. 5 is a system diagram illustrating system components of still another embodiment of the invention.

Referring now to FIG. 5, camera 210 is illustrated as being movable within a range (by the depicted arrows) and generally pointing toward a transparent LCD display 512 having a touch screen interface 214 in contact therewith. The LCD display of this embodiment requires no back light, and instead preferably has the array of liquid crystal cells that define the display mounted within a frame that displays the output of the computer 100, either with or without signal inversion by DVI inverter 218. As in the embodiment of FIG. 4, there are no significant calibration issues because there is preferably no distance D between the image or the projected image and the touch screen interface 214, 512. The image presented on the display 512 can be black and white—an artifact of present LCD displays, and if so, an overlay module comprising code executing in the computer can operate to overlay an in-color image that is combined with the camera output by the video mixer 220. Indeed, the overlay module can be utilized in connection with the other embodiments described herein to overlay CG content at various stages of the production, including within the video mixer 220, 220a.

Optionally, a keystone module executes within the computer 100 or elsewhere in conjunction with the overlay module to correct for any angular displacement of the camera 210 from a normal, central axis perpendicular to the display 512.

In another implementation, as shown in FIG. 6, computer system 100 includes modules that implement, in code, the functionality of the inverter 218 and the mixer 220, as described in detail above.

In particular, as described above, an inverter module 218a includes code that executes in the computer 100 so as to configure the processor to re-map at least a portion of the normal video output of a computer in reverse and/or upside down. As such, the re-mapped portion can include any CG objects created or otherwise presented by the computer 100. Meanwhile, a teleprompt script can be retained in normal-video output orientation and served by the computer 100, if desired. The inverter module 218a can include code that implements a video driver to drive the re-mapped video signals to the monitor 216. In this way, the inverted video output can be provided to the monitor 216 while a normal video output is available at another port for connection to a monitor that is viewed by persons other than the user 250. Alternatively, the inverter module 218a is provided to a video processing chip of the computer system 100 as the video output of the computer. As with the inverter 218, the images presented on the monitor 216 are preferably inverted as they reflect off of the one-way mirror 212 so as to appear in the proper orientation relative to the teleprompter user 250.

Also, a video mixer module 220a includes code that executes in the computer 100 so as to configure the processor to mix the normal video output of the computer (and preferably not the output of the inverter module 218a) together with the video output of the camera 210. As described above, the camera output is received at an input port of the computer 100, for example an HDMI port, and is mapped so as to retain the fidelity of the image as an array of digital picture elements. The output of video mixer device 220 is a combination of signals from the camera 210 and the computer 100. The manner of mixing the signals by the video mixer module 220a to provide the combination can be varied. One algorithm for mixing the signals is a binary combination of the CG content in any graphical objects created by the computer at a given moment in time with the mapped array from the camera at that same moment in time. This mixing can result in the CG content being arranged in the foreground as an overlay in front of the image of the user 250 captured by the camera. Such an output can be facilitated by passing the CG content through the green screen module discussed above, and then combining the array derived from the camera output with the filtered CG content. Another algorithm for mixing the signals utilizes data in an alpha channel (an "alpha map" or "transparency map") to obtain settings concerning the degree of transparency, or, conversely, the opacity, of each individual CG content that is being created by the computer at a given moment in time and combining the array derived from the camera output with all of the computer output in accordance with the alpha map. As understood in the art, the alpha channel provides metadata associated with the CG content that defines, on a grey scale, say, from 0 to 255, the transparency or opacity that is to be assigned to a given object. The alpha channel comprises data in the computer and associated with the various CG objects that are to be displayed by the computer 100 or associated with the entire desktop image. As such, as shown in FIG. 7a, the desktop image 700 can include several objects such as a temperature widget 710, a streamed video player 720, a document 730, and a picture 740, whereas an alpha map includes a transparency value 702 for each pixel on the desktop, including values 712, 722, 732, and 742 associated with respective objects 710, 720, 730, and 740. The alpha map data is accessed from a memory or other data store and utilized by the video mixer module 220a to transform the CG content into objects that can be presented over the mapped array from the camera, in corresponding pixel locations. The computer 100, therefore, can provide CG content with associated alpha map values to the video mixer 22a for combining with images provided by the camera. The combined signals from the video mixer 220a are provided to a media output port 222, such as an HDMI output port, for media distribution thereof. The media distribution can be a broadcast, multicast, or unicast transmission of the resulting image array to an audience of one to many viewers.

Figure 8:
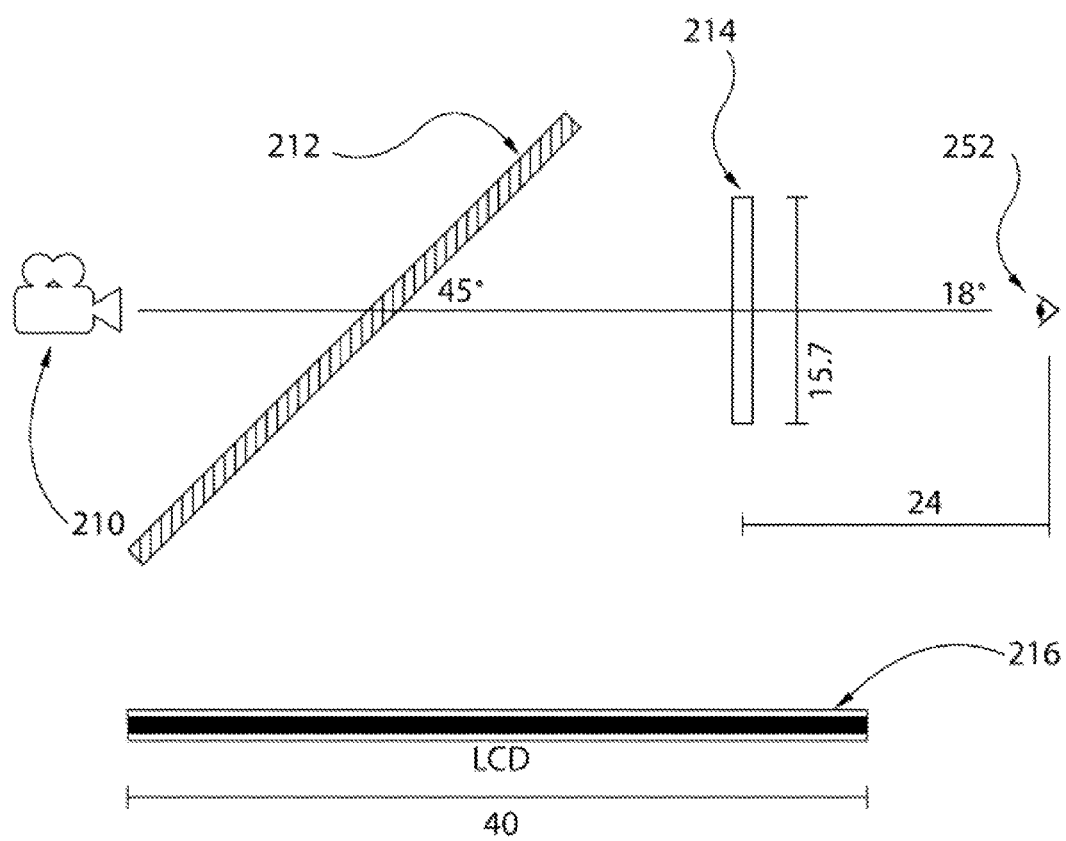
FIG. 8 shows a system diagram illustrating an arrangement for a rig including a camera, one-way mirror, touchscreen interface and monitor.
Figure 9:
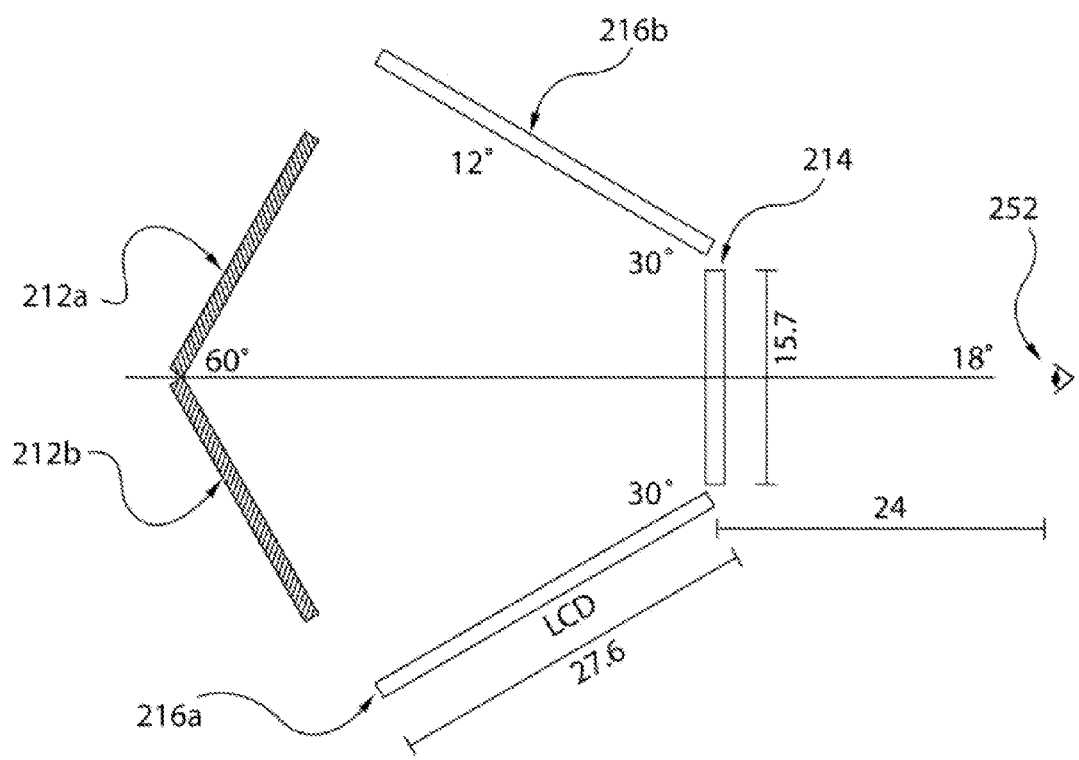
FIG. 9 shows another system diagram arrangement for a rig including a camera, two one-way mirrors, a touchscreen interface and two monitors.
Figure 10:
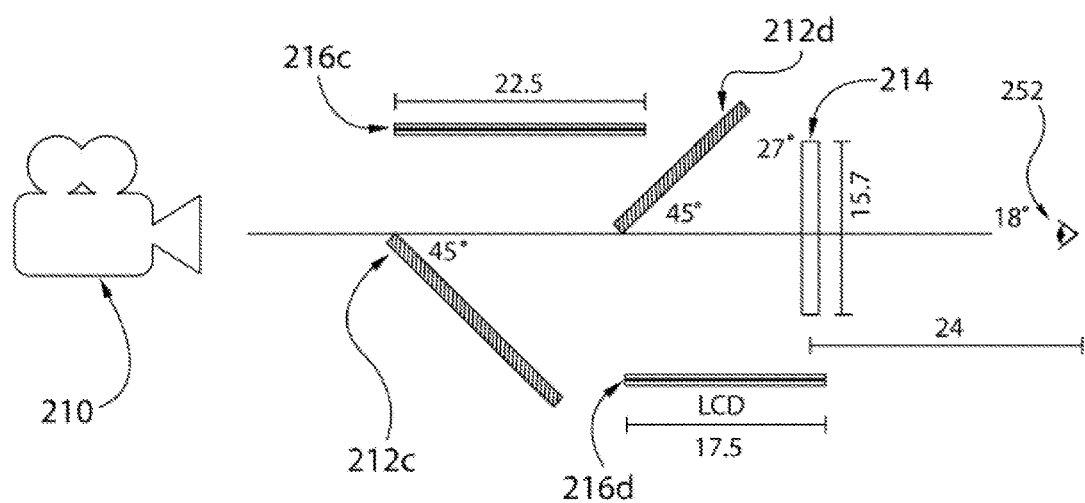
FIG. 10 shows still another system diagram arrangement for a rig including a camera, two one-way mirrors each with an associated monitor, and a touchscreen interface.

Turning briefly to FIGS. 8-10, several arrangements for a rig are illustrated. Like reference numbers are used to denote parts discussed above, and other features such as the computer system 100 are omitted so as to focus attention on the illustrated arrangements. In FIG. 8, the angular orientation of the mirror 212 relative to the camera 210, and the dimensions of the touchscreen interface 214 and the monitor 216 are called out as one exemplary arrangement, as well as the spacing to the user's eyes 252. In FIG. 9, another arrangement for a rig has the lens of the camera 210 oriented along a central axis of the touchscreen 214, while monitors 216a and 216b are provided and arranged to provide reflected images to the user's eye 252 through respective one-way mirrors 212a, 212b. Exemplary relative dimensions and spacing are also indicated. In FIG. 10, another rig arrangement again has the lens of the camera 210 oriented along a central axis of the touchscreen 214, while monitors 216c and 216d are provided and arranged to provide reflected images to the user's eye 252 through respective one-way mirrors 212c, 212d. Exemplary relative dimensions and spacing are also indicated.

Figure 11:
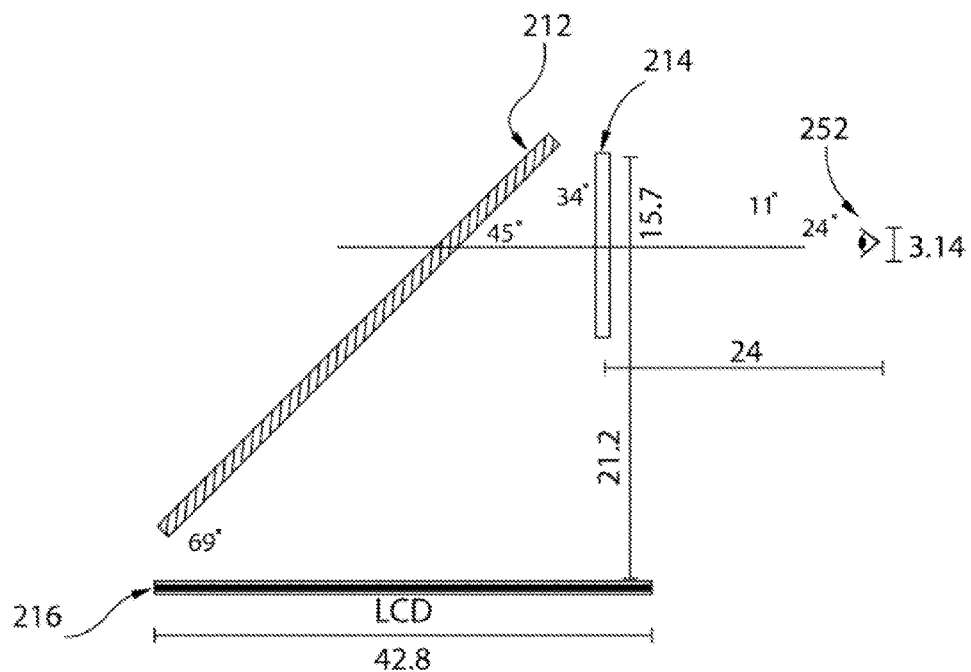
FIG. 11 shows a system diagram and illustrates the user looking through the interface off-axis.

Referring now to FIG. 11, a scenario in which the user's eyes 252 is off-axis is illustrated. The other features of FIG. 11 are not relied upon in this disclosure.

Figure 12:
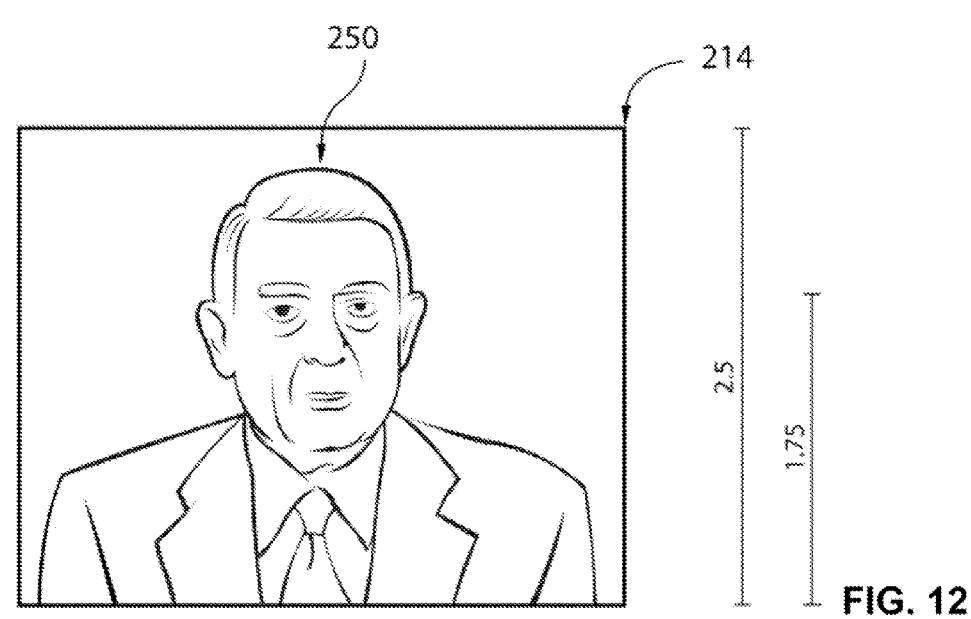
FIG. 12 is an image of a personality (user) captured by the camera through the touchscreen interface, without any CG content on the screen.

FIG. 12 is an image of a personality (the user 250) captured by the camera through the touchscreen interface 214. In FIG. 12, no CG content is on the screen.

In the various embodiments described herein, because the computer-generated content is presented in a plane in front of the on-air personality, there is a tension between having an image that viewers can perceive that is not horizontally reversed and the image that is presented to the user who is looking back at the viewing audience (that is, looking at the camera 210). Depending on the embodiment, there is an inversion or at least a horizontal reversal either of the computer-generated image on the input side, or of the camera output feed on the output side, or both. Depending on the embodiment, further modules can be used to reinforce the computer-generated image through superimposition, substitution, and the like. In one embodiment, an overlay module as described above can be used to replace and/or overlay CG content in/over one or more defined regions of the desktop. In this way, even if content is presented to the user 250 in forward orientation such that there are any ghost images in reverse text, or other artifacts due to the user interacting with the content, the overlay module can provide the video mixer 220, and/or the video mixing module 220*a* with content with a normal orientation for combination with the user image captured by the camera.

It is also to be appreciated that when the aforesaid integrated media content output is provided to an Internet/network-connected interactive user device, such as a computer, smart phone (e.g., iPhone), tablet device (e.g., iPad™), or the like, the content can include, in addition to the information to be displayed and/or a composite signal output by the computer system 100, certain metadata that can be used to enable the manipulation of the data at the viewer device 810, and/or enable selection of further content in addition to the media that has been output by the media output port 222 of the computer system 100. By way of example and not limitation, the metadata can include URLs and hyperlinks to resources available on the Internet such as one or more websites and the hyperlinks can be displayed for interaction with the viewer through the same presentation software that is used by the interactive user device to display the media from the computer system 100. In addition, in certain embodiments such URLs and hyperlinks can have associated parameters that direct the viewer device 810 to specific content curated by the user 250 and/or his producer.

Figure 4A:
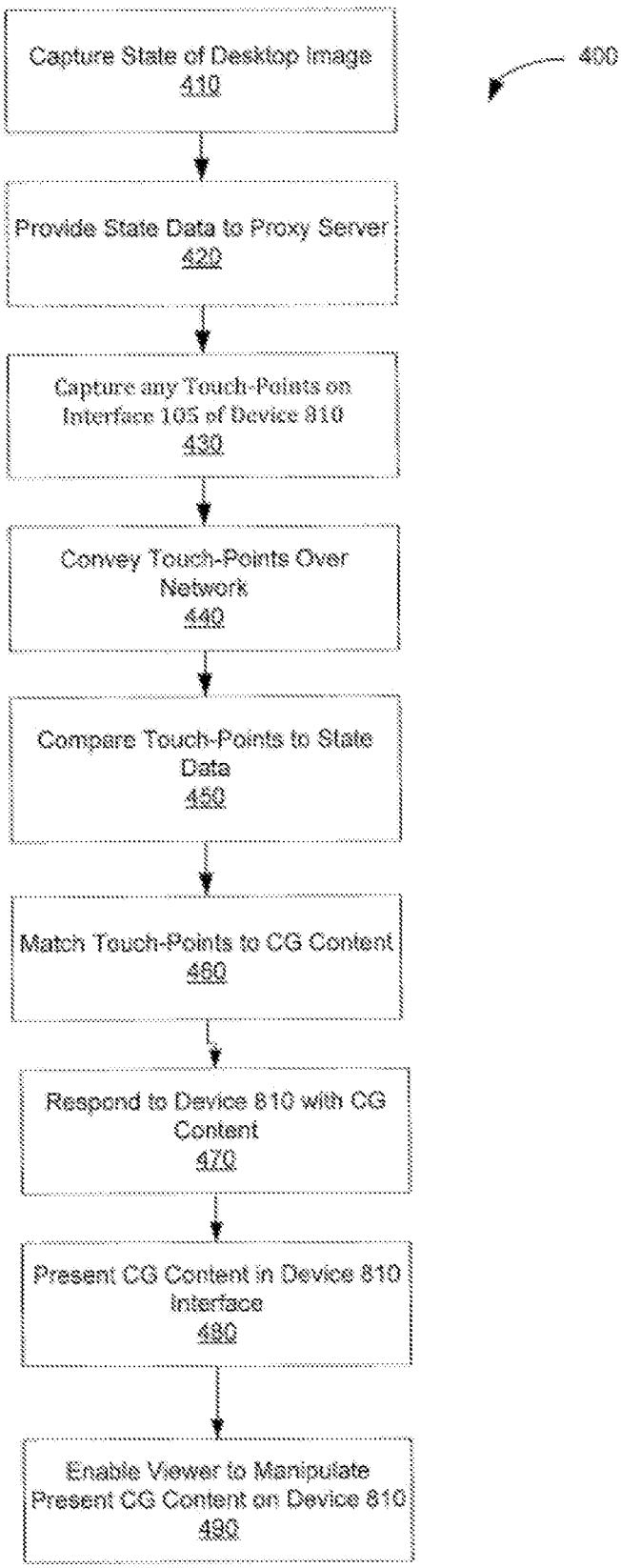
FIG. 4A is a flow diagram depicting one example of viewer interaction with curated content.

FIG. 4A depicts a flow diagram of one example 400 of viewer interaction with curated content. The output from the media port 222 of the computer system 100 preferably is accompanied by an image map. In one implementation, the output includes a client side image map. In this implementation, the state of the desktop image based on selections and manipulations by the curator 250 is captured on a continuous basis (step 410). Optionally, that state data is provided to a proxy server to manage communications with plural devices 810 (step 420). Meanwhile, a client map module executing on the device 810 captures any touch-points on the user interface 105 of the device 810 (step 430). Such touch-points are conveyed through the network 830 back to the computer system 100 or to a proxy server for action (step 440). In particular, the communications, which can be in a conventional protocol, identify the coordinates that the user has touched, and this is compared to the state map (step 450) and matched to the CG content that the curator presented to the viewer at that particular state (step 460). The computer system 100 or proxy responds with either the content itself as an object, or a link to the content (step 470). The object is retrieved onto the viewer device (step 480) and is available for manipulation by the viewer (step 490), independent of actions of any other viewer that may happen to be viewing the same output from the curator. In other words, the curator is not sharing objects on his or her desktop, but rather is enabling each viewer to select and take control of such object on their local/remote device. Of course, if the object is proprietary, a subscription, login, enrollment, fees, or other requirements may condition the viewer's ability to manipulate the content presented by the curator on his or her own viewer device 810. Moreover, the capabilities of the viewer device can be tested before providing content to ensure compatibility with the players and other containers on the viewer device.

In another implementation, the output includes a server side image map. Similar to the implementation just described, a viewer can touch the user interface 105 of the device 810 and the coordinates of that touch point are sent back to the computer system 100 or a proxy server for interpretation. In response, the viewer device is directed to a location where the content can be retrieved. This implementation reduces the load on the computer system 100 or the proxy server, and shifts the retrieval functions to the viewer device.

It should be understood that the output from the computer system 100 can include as metadata information concerning the CG content in the form of URLs plus parameters that enable the viewer device 810 to pull the curated, CG content to the device for viewing. The URL can cause, for instance, a specific item available through the network 830 (e.g., a spinning globe), while the parameters that accompany the URL enable the curator to highlight or otherwise control the globe to indicate a region of interest. In this mode of operation, the CG data, or at least a part of it, is an overlay on the client side, with the metadata defining where on the interface each object is to be presented, its size, rotational orientation, transparency, and so on. Such content can be delivered asynchronously, permitting the user to select content and view it long after the curator has moved on to other topics.

In one mode of operation, a producer of a show outputting the media from the computer system 100 selects further content and tags it to the output media stream to send to the viewer as an extension of the broadcast content. For instance, the presentation software can comprise a browser program such as Safari, Internet Explorer, or Mozilla Firefox which presents the media within a window thereof. The further content can be presented in the same window or a different window than the browser window that is showing the media delivered from the computer system 100. As can be appreciated, the viewer's device can be used to select such further content and to take one or more actions, including without limitation, the downloading or streaming of further content from the Internet, or conduct of an e-commerce transaction.

In the event that the viewer interacts with the further content, the broadcast media can automatically pause so that the viewer can explore the additional content and resume viewing of the broadcast media without missing anything. Optionally, the further content displayed to the viewer is filtered or otherwise tailored in view of viewer profile information, or demographic information, or both.

It should be appreciated that the embodiments of this invention can be incorporated as a software algorithm, program or code residing in hardware, firmware and/or on a computer useable medium (including software modules and browser plug-ins) that can be executed in a processor of a computer system to configure the processor to perform the functions that have been described. Such a computer system typically includes memory storage configured to provide output from execution of the computer algorithm, code, or program.

It is intended that features of one embodiment can be used with equal advantage in other embodiments described herein. As one example, the video mixer module 220*a* implemented by code, and the manipulation of data and signals using one or more processors that have been configured by such code and other modules, that transforms such data and signals into combined content for distribution to viewers can be used with the embodiments of FIGS. 2, 4, and 5, and in the method of FIG. 3 in the same way as described in connection with FIG. 6. Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the scope of the present invention.

What is claimed is:

1. A system comprising,
    a computing device configured by code and operable to generate interactive media content to be displayed on a display, the generated interactive media content comprising content curated by a user for interaction at one or more remote devices;
    a camera for capturing images of a user;
    a display coupled to the computing device that displays a first arrangement of all of the generated interactive media content;
    a touch-screen interface having a transparency positioned intermediate to the user and the camera and positioned such that the camera captures one or more images of the user through the transparency, the touch screen interface being coupled to the computing device and operable to enable selection and manipulation of a portion of the generated interactive media content that is displayed on the display, wherein the portion is less than all of the generated interactive media content; and
    a video mixer coupled to the camera and operative to integrate the one or more images of the user together with the portion of the generated-interactive media content as selected by the user via the touch-screen interface, thereby generating a coordinated presentation, the coordinated presentation comprising (a) a second arrangement comprising the portion of the generated interactive media content that is different from the first arrangement and integrated with the images captured by the camera by the video mixer module and (b) one or more hyperlinks, the one or more hyperlinks comprising at least one of (a) one or more hyperlinks that enable manipulation of the generated interactive media content at one or more remote devices, and (b) one or more hyperlinks that enable selection, at the one or more remote devices, of content other than the generated interactive media content;
    wherein the coordinated presentation is capable of transmission to and receipt by the one or more remote devices; and
    wherein the coordinated presentation is configured to enable interaction with the second arrangement including at least the portion of the generated interactive media content within the second arrangement at each of the remote devices such that results of a respective interaction at a particular remote device are viewable at the particular remote device but are not viewable at (a) other of the remote devices and (b) the display.

2. The system of claim 1, wherein the generated interactive media content is viewable at the one or more remote devices in a manner that reflects a view of the generated interactive media content on the display.

3. The system of claim 1, wherein the generated interactive media content is a hyperlink.

4. A system comprising,
    a computing device having a processor and a memory, the computing device being configured by code stored in the memory and executed by the processor to generate interactive media content to be displayed on a display, the generated interactive media content comprising content curated by a user for interaction at one or more remote devices;
    a camera for capturing one or more images;
    a display coupled to the computing device that displays a first arrangement of all of the generated interactive media content;
    a touch-screen interface coupled to the computing device and operable to enable selection and manipulation of a portion of the generated interactive media content that is displayed on the display, wherein the portion is less than all of the generated interactive media content; and
    a video mixer module stored in the memory which, when executed by the processor, integrates the images captured by the camera together with the portion of the generated interactive media content as selected by the user via the touch-screen interface, and thereby generates a coordinated presentation, the coordinated presentation comprising a second arrangement comprising the portion of the generated interactive media content that is different from the first arrangement and integrated with the images captured by the camera by the video mixer module;
    wherein the coordinated presentation is capable of transmission to and receipt by the one or more remote devices; and
    wherein the coordinated presentation is configured to enable interaction with the second arrangement including at least the portion of the generated interactive media content within the second arrangement at each of the remote devices such that results of a respective interaction at a particular remote device are viewable at the particular remote device but are not viewable at (a) other of the remote devices and (b) the display.

5. The system of claim 4, wherein the computing device comprises the camera, the display, and the touch-screen interface.

6. The system of claim 4, further comprising an inverter module stored in the memory, which, when executed by the processor, inverts the media content displayed on the display.

7. The system of claim 4, wherein the coordinated presentation further comprises one or more hyperlinks, the one or more hyperlinks comprising at least one of (a) one or more hyperlinks that enable manipulation of the generated media content at the one or more remote devices, and (b) one or more hyperlinks that enable selection, at the one or more remote devices, of content other than the generated interactive media content.

8. The system of claim 4, further comprising an annotation module operable to impart a visual cue at the touch screen interface, the visual cue corresponding to one or more locations within the first arrangement that are transposed as one or more locations within the second arrangement that are different from the one or more locations within the first arrangement, wherein the visual cue is viewable at the display but not at the one or more remote devices.

9. The system of claim 4, wherein the computing device is further configured to map one or more locations within the first arrangement to one or more locations within the second arrangement and wherein a manipulation of the generated interactive media content by the user in relation to the first arrangement is transmitted to the one or more remote devices such that the manipulation is presented at the one or more remote devices in relation to the second arrangement.

10. The system of claim 4, wherein the content other than the generated interactive media content is curated by the user.

11. A system comprising,
a computing device configured by code and operable to generate media content to be displayed on a display, the media content comprising content curated by a user for interaction at one or more remote devices;
a camera for capturing images;
a display coupled to the computing device that displays a first arrangement of all of the generated media content;
a touch-screen interface having a transparency positioned intermediate to the user and the camera and positioned such that the camera captures one or more images of the user through the transparency, the touch screen interface being coupled to the computing device and operable to enable selection and manipulation of a portion of the generated media content that is displayed on the display, wherein the portion is less than all of the generated interactive media content;
a video mixer coupled to the camera and operative to integrate the one or more images of the user together with the portion of the generated-interactive media content as selected by the user via the touch-screen interface, thereby generating a coordinated presentation, the coordinated presentation comprising a second arrangement comprising the portion of the generated interactive media content that is different from the first arrangement and integrated with the images captured by the camera by the video mixer module;
wherein the coordinated presentation is capable of transmission to and receipt by the one or more remote devices; and
wherein the coordinated presentation is configured to enable interaction with the second arrangement including at least the portion of the generated interactive media content within the second arrangement at each of the remote devices such that results of a respective interaction at a particular remote device are viewable at the particular remote device but are not viewable at (a) other of the remote devices and (b) the display.

12. The system of claim 11, further comprising a one-way mirror positioned intermediate to the camera and the touch-screen interface and oriented such that (a) the one-way mirror reflects images from the display to the user through the touch-screen interface and (b) the camera captures the one or more images of the user through the one-way mirror.

13. The system of claim 11, further comprising a green screen module operable to further configure the computing device so as to render at least a portion of the generated media content invisible.

14. The system of claim 11, further comprising a calibration module operable to further configure the computing device so as to minimize a misregistration between the user and the touch screen interface.

15. The system of claim 12, further comprising a face recognition module executing as part of the code in the computing device and operable (a) to determine any movement of the user, and (b) to dynamically calibrate the touch screen interface in response to any movement of the user.

16. The system of claim 15, further comprising a second camera, wherein the calibration module (a) configures the second camera to capture one or more images and (b) configures the computing device to determine any movement of the user by analyzing the images captured by the second camera.

17. The system of claim 11, further comprising an annotation module operable to impart a visual cue on the touch screen interface.

18. The system of claim 11, further comprising an overlay module operable to include the generated media content over the integrated images of the video mixer.

19. The system of claim 16, further comprising a keystone module operable to (a) alter a keystone of the generated media content and (b) provide the altered generated media content to the overlay module for overlay onto the integrated images of the video mixer.

20. The system of claim 11, wherein the camera captures the one or more images of the user free of any generated media content.

* * * * *